(12) United States Patent
Ghabra et al.

(10) Patent No.: US 6,737,955 B2
(45) Date of Patent: May 18, 2004

(54) METHOD AND SYSTEM FOR PASSIVE ENTRY AND PASSIVE ANTI-THEFT

(75) Inventors: Riad Ghabra, Dearborn Heights, MI (US); Magda H.R. Hakim, Livonia, MI (US); Carl L. Gilbert, Detroit, MI (US)

(73) Assignee: Lear Corporation, Southfield, MI (US)

( * ) Notice: Subject to any disclaimer, the term of this patent is extended or adjusted under 35 U.S.C. 154(b) by 77 days.

(21) Appl. No.: 10/263,484

(22) Filed: Oct. 3, 2002

(65) Prior Publication Data

US 2004/0075530 A1 Apr. 22, 2004

(51) Int. Cl.[7] ................................................. H04Q 9/00
(52) U.S. Cl. .................. 340/5.2; 340/5.24; 340/426.35; 340/5.25; 340/5.54; 340/5.6; 307/10.5
(58) Field of Search .................. 340/5.2, 5.21, 340/5.22, 5.23, 5.24, 5.25, 5.54, 5.6, 5.61, 5.65, 518, 426.35, 425.36; 307/10.5, 10.1, 10.1 L, 9.1

(56) References Cited

U.S. PATENT DOCUMENTS

| 4,990,906 A | 2/1991 | Kell et al. |
| 5,508,694 A | 4/1996 | Treharne et al. |
| 5,635,900 A | 6/1997 | Hasegawa et al. |
| 5,986,563 A | 11/1999 | Shapiro |
| RE36,505 E | 1/2000 | Treharne et al. |
| 6,133,649 A | 10/2000 | Iwamoto et al. |
| 6,160,488 A | 12/2000 | Honda |
| 6,204,570 B1 * | 3/2001 | Muller ..................... 307/10.5 |
| 6,269,292 B1 | 7/2001 | Kokubu et al. |
| 6,331,812 B1 | 12/2001 | Dawalibi |
| 6,380,842 B1 | 4/2002 | Mattes et al. |
| 6,384,711 B1 | 5/2002 | Cregger et al. |
| 6,392,543 B2 | 5/2002 | Maloney |
| 6,407,665 B2 | 6/2002 | Maloney |
| 2001/0028928 A1 | 10/2001 | Liden et al. |

OTHER PUBLICATIONS http://www.ti.com/tiris/docs/news/news_releases/2002/re17-02-02.shtml.

* cited by examiner

Primary Examiner—Donnie L. Crosland
(74) Attorney, Agent, or Firm—Bill C. Panagos

(57) ABSTRACT

A system for determining a total number of access devices associated with a target includes a controller and an access device. The controller may be configured to control operation of the target. The access device includes a partially restricted memory configured to store the total number of the access devices associated with the target and to provide unrestricted read access to the total number, and a restricted memory configured to store a password. A read operation of the restricted memory is restricted by an authorization code.

20 Claims, 2 Drawing Sheets

METHOD AND SYSTEM FOR PASSIVE ENTRY AND PASSIVE ANTI-THEFT

BACKGROUND OF THE INVENTION

1. Field of the Invention

The present invention relates to vehicle entry and anti-theft systems generally and, more particularly, to a method and system for passive entry and passive anti-theft.

2. Background Art

Many conventional passive anti-theft systems (PATS) that implement engine immobilizer technology also implement vehicle ignition keys that contain a code (or password) in a memory internal to the key that enables the engine to start when matched to the password that is stored in a memory in the vehicle immobilizer system controller. Similar password matching technology is implemented for many conventional vehicle passive entry systems and lock box systems.

One form of vehicle theft fraud involving vehicles that are equipped with engine immobilizer systems such as PATS occurs when a vehicle owner (or lessee) obtains at least one additional key and programs the new key or keys with the password (as well as mechanically cutting the new key to match the vehicle ignition switch lock). The vehicle owner furnishes a thief with a key that has the vehicle password and the thief takes the vehicle. The owner fraudulently reports the vehicle as stolen and presents the insurance company with the original number of password programmed keys as evidence that the vehicle was stolen.

A similar scenario can be perpetrated by a passive entry equipped vehicle owner (or lessee) who has arranged for the vehicle or personal property inside of the vehicle to be stolen from the vehicle by making at least one additional passive entry device for the thief to employ in the arranged theft. Similarly, unscrupulous people who have access to real estate with lock box access can arrange for theft of personal property from the real estate by making at least one additional lock box key.

Conventional approaches at attempting to reduce and/or prevent vehicle theft insurance fraud have included limiting the total number of keys that can be programmed to a particular vehicle and/or storing the total number of keys that are programmed for the vehicle in restricted access memories in the keys and in the vehicle immobilizer system as the new keys are programmed. However, in one example of conventional approaches, access to the memories that store the total number of keys that are programmed to the vehicle is limited by a restricted (or secret) memory access authorization code or password that is only available to the manufacturer of the vehicle and/or an authorized agent such as a dealer or locksmith. The restricted memory access authorization password or code information is typically closely guarded and generally not available to insurance and/or police investigators. Furthermore, readout of the total number of keys that are programmed to the vehicle can require costly special diagnostic tools.

In the example of a conventional system that provides full, unrestricted read/write access to the key and/or vehicle memory that contains the total number of programmed keys, the owner has a method for altering the stored number of keys that are programmed to the vehicle. Thus, the owner can hide the fact that an additional key or keys have been made for theft purposes. Therefore, conventional anti-theft systems do not provide an insurance company a convenient, simple, effective, low cost system and method of determining the actual total number of keys that have been programmed to an alleged stolen vehicle.

Thus, there exists a need for a simple, low cost and easy to implement system and/or method for determining the number of keys that have been programmed to a vehicle anti-theft and/or passive entry system. Such an improvement would thereby enable insurance companies to easily and rapidly determine how many programmed vehicle keys should be presented when a vehicle is reported as stolen. The insurance company may provide an insurance rate reduction to owners of vehicles equipped with the system and method for quickly and easily determining the number of keys that have been programmed to the vehicles. To prevent modification of the number of programmed keys by an owner attempting to defraud the insurance company, such a system should be implemented as a read only solution to the insurance investigator.

The present invention may also be advantageously implemented in other password coded lock applications such as passive entry systems where vehicle access is enabled and/or disabled via password coded devices (i.e., "key cards"), real estate lock boxes, etc.

SUMMARY OF THE INVENTION

Accordingly, the present invention provides an improved access device system and an improved method of determining a total number of access devices that are programmed to a controller where an access device includes a partially restricted memory configured to store the total number of access devices that are programmed and provide unrestricted read access to the total number, thereby enhancing insurance company detection of fraudulent vehicle theft.

According to the present invention, a system for determining a total number of access devices associated with a target is provided comprising a controller configured to control operation of the target and an access device comprising a partially restricted memory configured to store the total number of the access devices associated with the target and to provide unrestricted read access to the total number, and a restricted memory configured to store a password, wherein a read operation of the restricted memory is restricted by an authorization code.

Also according to the present invention, a method for determining a total number of programmed access devices is provided comprising storing a password in a restricted memory on the access device, wherein a read operation is restricted by an authorization code and storing the total number of programmed access devices in an unrestricted read access memory on the programmed access device.

Still further according to the present invention, an access device for use in a system for determining a total number of access devices that are associated with a controller is provided comprising a partially restricted memory configured to store the total number of access devices that are associated with the controller and to provide unrestricted read access to the total number and a restricted memory configured to store a password.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an improved method and/or system for determining the total number of access devices that have been programmed in a password controlled access device system such as a passive entry system and/or passive anti-theft system (PATS). The present invention may reduce and/or prevent insurance fraud.

Figure 1:
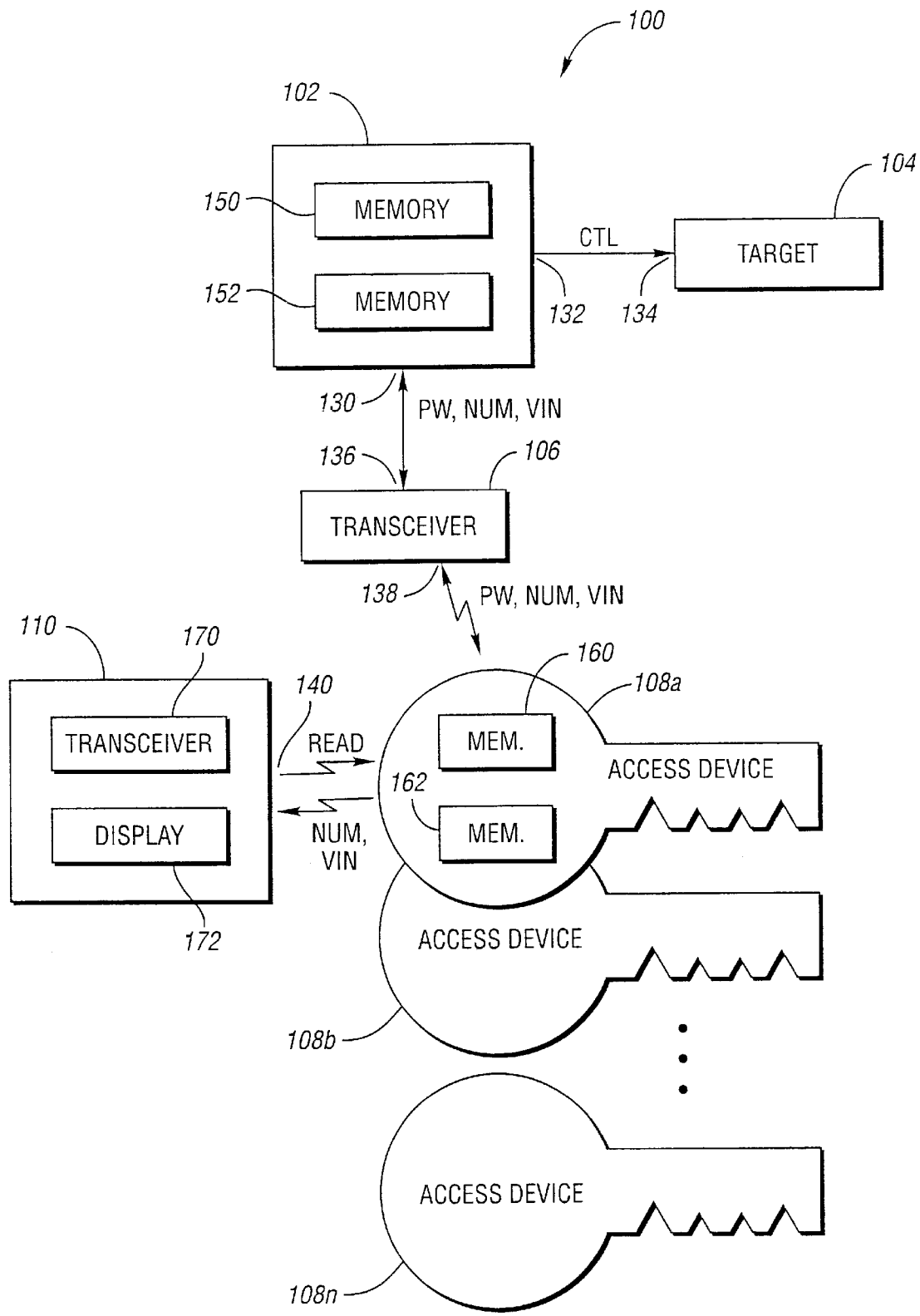
FIG. 1 is a diagram illustrating a control system in accordance with a preferred embodiment of the present invention.

Referring to FIG. 1, a diagram illustrating a system 100 in accordance with a preferred embodiment of the present invention is shown. The system 100 is generally implemented as a control system. The system 100 is generally configured to control (or target) at least one operation (i.e., process, routine, feature, method, etc.). The target operations are generally authorized (or authenticated) when a system controller password and an access control device password match. The system 100 may be implemented in connection with a mutual authentication encryption algorithm. In one example, the target operations may be at least one passive entry/exit operation (e.g., locking and/or unlocking vehicle openable members such as a door, a hatch, a trunk, etc.). In another example, the target operations may be at least one anti-theft related operation (e.g., engine immobilization, powertrain control module enable/disable, fuel pump enable/disable, fuel injector control enable/disable, etc.). In the case of real estate lock boxes or similar applications, the operation controlled via the system 100 may be a lock box lock/unlock control operation. However, the system 100 may be implemented in connection with any appropriate operation to meet the design criteria of a particular application.

The system 100 generally comprises a controller 102, a target 104, a transceiver 106, at least one access device 108 (e.g., the devices 108a–108n), and a reader 110. The controller 102 may be implemented as a system controller. In one example, the controller 102 may be implemented as a stand-alone circuit. However, the controller 102 may be implemented in connection with another circuit and/or apparatus (e.g., a powertrain control circuit, an electronic instrument cluster, etc.) to meet the design criteria of a particular application.

The target 104 generally corresponds to (or is related to) the operation that is controlled via the system 100. In one example (an anti-theft vehicle immobilizer), the target 104 may correspond to a fuel pump enable/disable, a fuel injector enable/disable, a starter activation/de-activation, etc. However, the target 104 may be implemented as any appropriate process, routine, circuit, apparatus, etc. to meet the design criteria of a particular application.

In one example (e.g., an anti-theft vehicle immobilizer), the transceiver 106 may be implemented in connection with a vehicle ignition switch mechanism. However, the transceiver 106 may be implemented as any appropriate circuit and/or apparatus to meet the design criteria of a particular application.

The at least one access device 108 is generally implemented as a key or key surrogate device (e.g., a "key card", a "smart card", etc.). In one example (e.g., an anti-theft vehicle immobilizer), the devices 108 may be implemented as vehicle ignition switch keys. In another example (e.g., a vehicle passive entry system), the devices 108 may be implemented as vehicle lock/unlock key cards (or smart cards). However, the access devices 108 may be implemented as any appropriate device and/or apparatus to meet the design criteria of a particular application.

The reader 110 may be configured to read at least one signal from the devices 108. In one example (a vehicle application), the reader 110 may be configured as a switch (e.g., an ignition switch) surrogate. However, the circuit 110 may be implemented as any appropriate reader to meet the design criteria of a particular application.

The controller 102, the target 104 and the transceiver 106 are generally implemented in the same environment. In the examples of an anti-theft vehicle immobilizer and/or vehicle passive entry system, the controller 102, the target 104 and the transceiver 106 are generally implemented in connection with the respective vehicle. The devices 108 are generally implemented as ignition keys and/or entry cards for the respective vehicle. The reader 110 is generally implemented as a stand-alone device that is operated by an investigator (e.g., an insurance investigator, police, etc.).

The controller 102 may have an input/output 130 that may receive/present at least one signal (e.g., PW, NUM, and/or VIN) and an output 132 that may present a signal (e.g., CTL). The signal PW may be implemented as a control signal. The signal PW may be implemented as a password or code word to authorize (or authenticate) the at least one operation controlled via the system 100.

The signal NUM may be implemented as a numeric value. The numeric value of the signal NUM may correspond to the total number of devices 108 that are programmed to the control password PW in the system 100. The signal VIN generally corresponds to the vehicle identification (generally an alphanumeric indicator) or a similar identification number that may uniquely identify the vehicle or system environment (e.g., a particular house address in the case of a real estate lock box application) where the system 100 is implemented.

In one example (e.g., a vehicle implementation), the identification VIN is generally entered in the controller 102 during the assembly of the vehicle where the system 100 is implemented. In another example (e.g., a real estate lock box implementation), the identification VIN may be entered into the controller 102 when the target 104 (e.g., a lock box) is installed at the location where the system 100 is implemented. However, the identification VIN may be entered into the controller 102 at any appropriate time to meet the design criteria of a particular application.

The signal CTL may be implemented as a control signal. The assertion/de-assertion of the signal CTL may be configured to activate/de-activate the at least one operation controlled via the system 100 (i.e., the target operation). The target 104 may have an input 134 that may receive the signal CTL. The target 104 may be configured to perform the at least one target operation in response to the signal CTL. The controller 102 is generally configured to control operation of the target 104 via the signal CTL.

The transceiver 106 may have an input/output 136 that may receive/present the signals PW, NUM, and/or VIN from/to the controller 102. The input/output 136 is generally connected to the input/output 130 of the controller 102. The transceiver 106 may have an input/output 138 that may receive/present the signals PW, NUM, and/or VIN from/to the devices 108a–108n. The transceiver 106 is generally configured to communicate the signals PW, NUM, and/or VIN from/to the devices 108a–108n individually via a wireless medium and/or a non-wireless path (not shown).

In one example; the transceiver circuit 106 may communicate with the devices 108 via radio waves (e.g., low frequency (LF) waves, radio frequency (RF) waves, etc.), light waves, acoustic waves, etc. In the case of the non-wireless path, the transceiver 106 may be replaced by a connector having at least one contact configured to electrically communicate with the at least one device 108. However, the transceiver 106 may communicate with the devices 108 via any appropriate medium to meet the design criteria of a particular application.

The reader 110 may have an input/output 140 that may receive the signals NUM and/or VIN and present at least one signal (e.g., READ). The signal READ may be a control signal (or command). The devices 108 may be configured to communicate (i.e., present) the numbers NUM and/or VIN to the reader 110 via an appropriate wireless (e.g., radio waves, etc.) and/or non-wireless medium in response to the at least one signal READ similarly to the communication implemented in connection with the controller 102.

The controller 102 generally comprises a fully restricted memory circuit 150 and a partially restricted memory circuit 152. The memory circuits 150 and 152 may be implemented as non-volatile memory (or pages of non-volatile memory). The memory 150 may be configured to store the value that corresponds to the control password PW. The memory (or page) 150 may be implemented as a fully restricted access memory. Except a normal activation/de-activation of the operation that is normally controlled via the system 100 and normal device 108 programming operations (i.e., operations that generally comprise a read of the memory 150), all access to the memory 150 may be limited (or restricted) via at least one restricted memory access authorization password or secret code. The limited access to the memory 150 may limit any other memory operation (e.g., write, erase, etc.) to an authorized user who possesses the authorization code.

The partially restricted memory 152 may be configured to store the values that correspond to the identification VIN and/or the number NUM (i.e., the memory 152 may be programmed with the values VIN and/or NUM). The memory 152 generally has restricted access (i.e., the access is limited to users who possess at least one memory access password or secret code) for memory operations except for an activation/de-activation of the operation that is normally controlled via the system 100, device 108 programming operations, and the read operation. The read operation of the memory 152 may be unrestricted. The investigator may be provided unrestricted access to read the information stored in the memory 152 (i.e., the values that correspond to the identification VIN and/or the number NUM). However, since unrestricted access of the memory 152 generally only corresponds to read operations, an owner (i.e., end user, lessee, etc.) is generally unable to alter the value VIN and only increment the value of the number NUM via control programming (i.e., programming the password PW into additional access devices 108).

The devices 108 each generally comprises a transponder having a memory 160 and a memory 162. In one example, the devices 108 may be powered via an internal battery and/or charged capacitance. The memories 160 and 162 may be implemented similarly to the memories 150 and 152, respectively. The investigator may be provided unrestricted access to read the information stored in the memory 162 (i.e., the values that correspond to the identification VIN and/or the number NUM). Since the alleged stolen vehicle where the controller 102 is implemented is generally unavailable, the investigator generally retrieves (i.e., performs a read operation to display) the values of the number NUM and/or the identification VIN that are stored in the access devices 108 that have been presented to the insurance company when a demand for payment for the alleged theft is made. However, if the alleged stolen vehicle where the controller 102 is implemented is recovered, the investigator may retrieve the values of the identification VIN and/or the number NUM from the memory 152 as well.

During a normal mode of operation of the system 100 (e.g., a vehicle start operation, a lock box open operation, etc.) one of the access devices 108 may be implemented in connection with the transceiver 106. The transceiver 106 may read the password PW from the access device 108 and present the password PW to the controller 102. If the password PW received from the access device 108 matches the password PW stored in the memory 150, the controller 102 may be authorized to assert/de-assert the signal CTL. The target 104 may perform at least one operation (e.g., the vehicle start, the lock box open, etc.) in response to the assertion/de-assertion of the signal CTL. If the password PW received from the access device 108 does not match the password PW stored in the memory 150, the controller 102 may alert the user or perform any appropriate operation to meet the design criteria of a particular application.

The reader 110 generally comprises a transceiver 170 and a display 172. The transceiver 170 is generally configured to present the signal READ to the at least one device 108 and receive the at least one number NUM and/or the identification VIN from the at least one device 108 in response to the signal READ. The display 172 is generally configured to display the value that corresponds to the at least one number NUM and/or the identification VIN in response to the signal READ.

The reader 110 may be advantageously implemented by the investigator to determine the total number of devices 108 that have been programmed with the password PW and associated with a particular controller 102 and target 104 (i.e., a particular vehicle, a particular real estate location, etc.). Since the reader 110 is generally configured to read the memory 162 of the access devices 108 and/or the memory 152 of the controller 102 without the implementation of expensive special equipment and/or secret authorization codes as in conventional approaches, the reader 110 may be low cost and/or easy to operate.

The system 100 is generally provided to the end user with at least one of the at least one access devices 108 pre-programmed with the password PW that corresponds to the controller 102 (i.e., an original device 108). The number NUM stored on the original devices 108 generally corresponds to the number of pre-programmed devices 108. When the end user (e.g., a vehicle purchaser, lessee, etc.) acquires and programs additional access devices 108 (e.g., spare vehicle keys) to the system 100, the system 100 will generally only control program the additional devices 108 with the password PW when at least one of the pre-programmed devices 108 communicates with the controller 102 during the programming operation. At least one of the original (i.e., pre-programmed) devices 108 are generally implemented to complete the new device 108 control programming sequence.

When an additional device 108 is programmed to the controller 102, the password PW will generally be stored (i.e., written, recorded, etc.) in the memory 160. The total number of access devices 108 that have been control programmed to the controller 102 (i.e., the number NUM) is generally incremented by one for each device 108 that is control programmed. The identification VIN will generally be stored in the memory 162 of the additional access device 108 currently in the programming process. The total number of access device 108 that have been control programmed to the circuit 102 (i.e., the new value NUM) will also generally be stored in the memory (or memory page) 162 of the pre-programmed (or original) access device 108 that is used in the new access device 108 programming process (or routine).

The total number NUM of control programmed access devices 108 will also generally be stored in at least one memory (i.e., page, location, etc.) 152 of the controller 102 that can be read without any secret code as is implemented in conventional approaches. The value NUM is generally not overwritten in the memory 152 and/or the memory 162 except when a device 108 is control programmed (or a previously programmed device 108 is used and the number NUM is updated on the device 108) unless the secret restricted access code is provided.

The investigator (e.g., a police and/or insurance investigator) may be able to read the memories (or pages) 152 and/or 162 that contain the value that corresponds to the identification VIN and/or the number NUM via the reader 110 in response to at least one generic command that provides access to the memories 152 and/or 162 without any secret codes (e.g., the signal READ). The memories 150 and/or 152, and 160 and/or 162 may generally be read, erased, programmed (e.g., written to), etc. by authorized users via conventional equipment (e.g., through a J1850/SCP and/or ISO-9141 link) only in connection with the limited access password.

To associate the controller 102 (and the target 104, i.e., the respective vehicle and/or environment element) with a given access device 108, the authorized user (i.e., the dealer, locksmith, etc. having the authorization code or password and the specialized equipment) may program the identification VIN into the memory 162 in the respective device 108. Therefore, the respective access device 108 may be associated with (or programmed to) the controller 102 in response to (i.e., based on) the value of the identification VIN.

Figure 2:
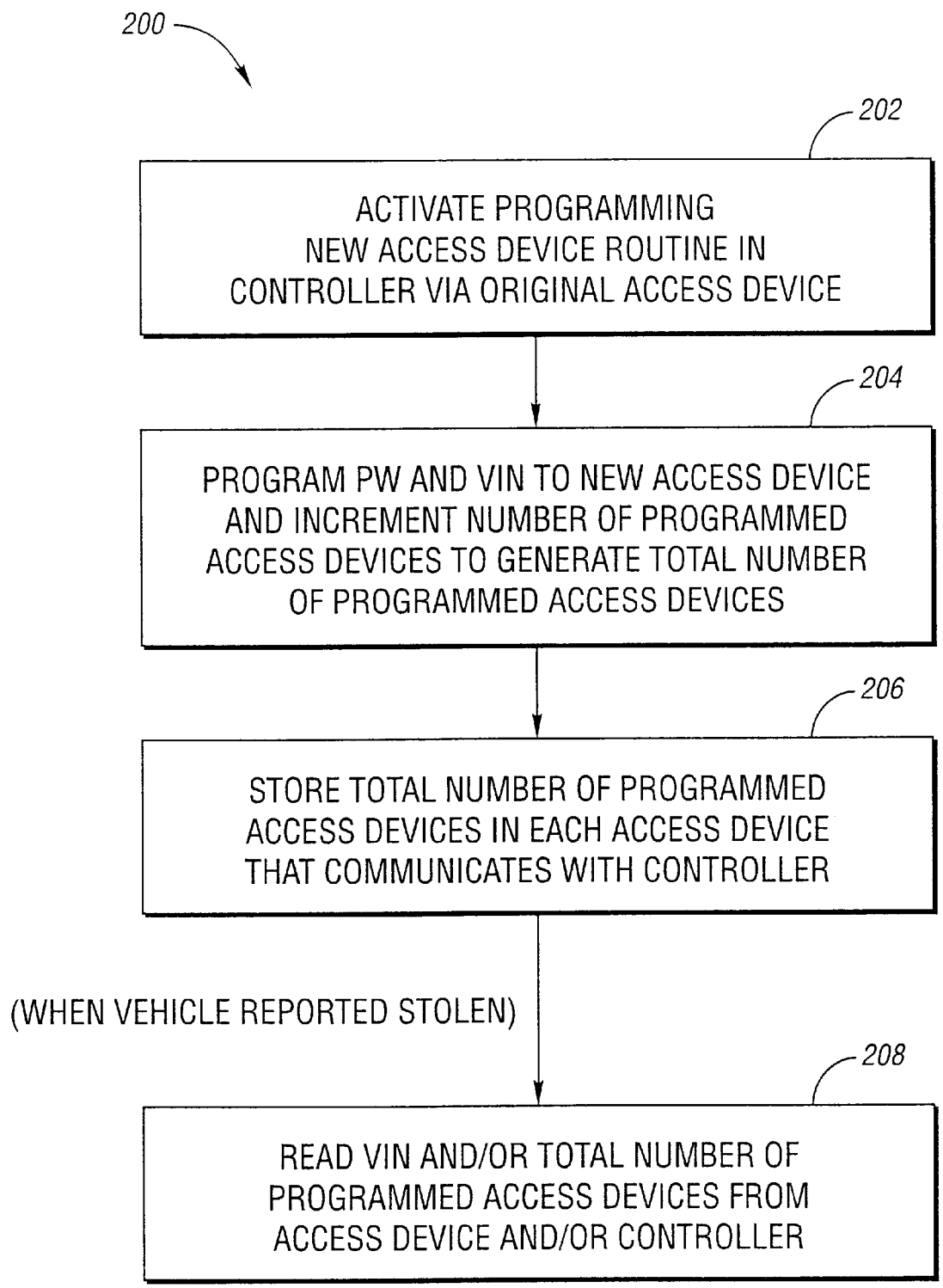
FIG. 2 is a flow diagram of a operation in accordance with a preferred embodiment of the present invention.

Referring to FIG. 2, a flow diagram illustrating an operation 200 in accordance with a preferred embodiment of the present invention is shown. The operation (i.e., method, process, routine, etc.) 200 may be implemented in connection with the system 100. The process 200 is generally related to individually programming at least one access device 108 to interface with a controller 102 that are in addition to the pre-programmed (i.e., originally furnished) at least one access device 108 and the determining of how many access devices 108 have been programmed to interface with the particular controller 102.

The method 200 may activate programming of a new access device 108 via interfacing at least one pre-programmed (i.e., original) access device 108 with the controller 102 at step 202. At step 204 the process 200 may further program (or store) the password PW into the memory 160 of the new access device 108 and increment by one the total number NUM of devices that have been programmed to the controller 102. The process 200 may further store the identification VIN into the memory 162 of the access device 108 that is currently being programmed.

The procedure 200 may store (step 206) the number NUM in the memory 152 of the controller 102, in the memory 162 of the access device 108 that is currently being programmed, and in the memory 162 of any access device 108 that has been programmed with the password PW and identification VIN and is subsequently interfaced with the controller 102 (i.e., successive access devices 108).

When the vehicle where the controller 102 is reported stolen and at least one access devices 108 is presented as evidence of theft, the investigator, via the process 200, may read (step 208) the identification VIN and/or the total number of keys NUM that have been programmed to the controller 102 from the memory 162 of the access devices 108 via the reader 110. When the number NUM read from any of the devices 108 is greater than the number of access devices 108 that are presented by the insurance claimant, the investigator may have reason to believe that the reported theft is fraudulent.

As is readily apparent from the foregoing description, then, the system 100 and/or the method 200 of the present invention provide an improved system and/or method, respectively, for the detection of passive entry system and/or PATS insurance fraud. The present invention may provide a partially restricted read operation from a memory in each of at least one access device (e.g., the memory 162 of the access devices 108). The memory 162 may be store the total number NUM of access devices 108 that have been control programmed (i.e., programmed with the password PW) and/or the identification number VIN. The insurance investigator may easily and quickly read the identification VIN and/or the number NUM via the low cost and simple to operate reader 110.

Since fraudulent theft insurance claims are more easily detected via the improved system and method for passive entry systems and/or PATS of the present invention, an insurance rate reduction may be provided to owners of vehicles equipped with the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for determining a total number of access devices associated with a target, the system comprising:

a controller configured to control operation of the target; and an access device comprising a partially restricted memory configured to store the total number of the access devices associated with the target and to provide unrestricted read access to the total number, and a restricted memory configured to store a password, wherein a read operation of the restricted memory is restricted by an authorization code.

2. The system of claim 1 further comprising a reader configured to read and display the total number of access devices that are associated with the target.

3. The system of claim 1 wherein the password authorizes the controller to control the operation of the target.

4. The system of claim 3 wherein the controller is configured to store the total number in the partially restricted memory of successive ones of the access devices that are implemented to control the operation of the target.

5. The system of claim 2 wherein the access devices are associated with the target by a programing operation comprising storing in the partially restricted memory an identification number that corresponds to an environment where the controller is implemented.

6. The system of claim 1 wherein the controller comprises:
   a partially restricted memory configured to store the total number of the access devices and to provide unrestricted read access to the total number; and
   a restricted memory configured to store the password.

7. The system of claim 5 further comprising a transceiver configured to communicate the total number, the identification number, and the password to and from each of the access devices and the controller.

8. The system of claim 5 wherein the reader comprises a transceiver configured to communicate the total number and the identification number from each of the access devices to the reader in response to at least one command.

9. A method for determining a total number of programmed access devices, the method comprising:
   storing a password in a restricted memory on the access device, wherein a read operation is restricted by an authorization code; and
   storing the total number of programmed access devices in an unrestricted read access memory on the programmed access device.

10. The method of claim 9 wherein the password is configured to authorize a controller to control operation of a target.

11. The method of claim 9 wherein the method comprises incrementing the total number by one during the programming operation for each of the access devices that are programmed.

12. The method of claim 10 further comprising storing in the unrestricted read access memory an identification number that corresponds to an environment where the controller is implemented during the programing.

13. The method of claim 12 further comprising reading from the unrestricted read access memory the total number of the programmed access devices and the identification number.

14. The method of claim 10 further comprising:
   storing in a partially restricted memory in the controller the total number of programmed access devices;
   providing unrestricted read access to the total number; and
   storing the password in a fully restricted memory in the controller.

15. The method of claim 13 wherein reading comprises communicating the total number, the identification number, and the password to and from each of the access devices and the controller.

16. The method of claim 13 wherein reading comprises communicating the total number and the identification number from each of the access devices to a reader in response to at least one command.

17. An access device for use in a system for determining a total number of access devices that are associated with a controller, the access device comprising:
   a partially restricted memory configured to store the total number of access devices that are associated with the controller and to provide unrestricted read access to the total number; and
   a restricted memory configured to store a password.

18. The access device of claim 17 wherein the system for determining a total number of access devices further comprises a reader configured to display the total number in response to at least one command and the controller has a restricted memory configured to store the password and to control operation of a target in response to matching the password stored in the access device with the password stored in the controller.

19. The access device of claim 17 wherein the password is for use in authorizing the controller to control operation of a target.

20. The access device of claim 17 wherein a read operation of the restricted memory is restricted by an authorization code.

* * * * *